United States Patent
Pineau et al.

(10) Patent No.: US 11,124,610 B2
(45) Date of Patent: Sep. 21, 2021

(54) POLYMER COMPOSITION THAT CAN BE EXTRUDED INTO A VAPOUR-PERMEABLE OBJECT

(71) Applicant: Arkema France, Colombes (FR)

(72) Inventors: Quentin Pineau, Evreux (FR); Thierry Briffaud, Pernay (FR); Karine Loyen, Pont-Audemer (FR); Laure Berdin, Bernay (FR)

(73) Assignee: ARKEMA FRANCE, Colombes (FR)

( * ) Notice: Subject to any disclaimer, the term of this patent is extended or adjusted under 35 U.S.C. 154(b) by 73 days.

(21) Appl. No.: 16/349,461

(22) PCT Filed: Nov. 14, 2017

(86) PCT No.: PCT/FR2017/053109
§ 371 (c)(1),
(2) Date: May 13, 2019

(87) PCT Pub. No.: WO2018/087501
PCT Pub. Date: May 17, 2018

(65) Prior Publication Data
US 2019/0338078 A1    Nov. 7, 2019

(30) Foreign Application Priority Data
Nov. 14, 2016   (FR) ...................................... 1661012

(51) Int. Cl.
| | | |
|---|---|---|
| C08L 71/00 | (2006.01) | |
| C08L 77/00 | (2006.01) | |
| C08G 65/00 | (2006.01) | |
| C08G 69/00 | (2006.01) | |
| C08G 81/00 | (2006.01) | |
| B29C 48/00 | (2019.01) | |
| C08J 5/18 | (2006.01) | |
| C08K 5/053 | (2006.01) | |
| B29C 48/08 | (2019.01) | |
| B29K 71/00 | (2006.01) | |
| B29K 77/00 | (2006.01) | |
| B29K 96/04 | (2006.01) | |
| B29K 105/00 | (2006.01) | |

(52) U.S. Cl.
CPC ............ *C08G 81/00* (2013.01); *B29C 48/022* (2019.02); *C08J 5/18* (2013.01); *C08K 5/053* (2013.01); *B29C 48/08* (2019.02); *B29K 2071/02* (2013.01); *B29K 2077/00* (2013.01); *B29K 2096/04* (2013.01); *B29K 2105/0085* (2013.01); *B29K 2105/0094* (2013.01); *B29K 2995/0065* (2013.01); *B29K 2995/0088* (2013.01); *C08G 65/00* (2013.01); *C08G 69/00* (2013.01); *C08J 2387/00* (2013.01); *C08L 71/00* (2013.01); *C08L 77/00* (2013.01)

(58) Field of Classification Search
None
See application file for complete search history.

(56) References Cited

U.S. PATENT DOCUMENTS

| | | | |
|---|---|---|---|
| 2003/0065084 A1* | 4/2003 | MacQueen ............. | A61L 9/012 524/538 |
| 2007/0066725 A1* | 3/2007 | Malet ..................... | A43B 13/04 524/99 |
| 2008/0182945 A1 | 7/2008 | Malet et al. | |

FOREIGN PATENT DOCUMENTS

| | | | | |
|---|---|---|---|---|
| EP | 1783156 A1 * | 5/2007 | ............. | C08G 69/40 |
| EP | 1783156 A1 | 5/2007 | | |
| EP | 2289986 A2 | 3/2011 | | |
| FR | 1603901 A * | 6/1971 | ............. | C08G 65/32 |
| WO | 0075220 A1 | 12/2000 | | |
| WO | 2006108959 A1 | 10/2006 | | |

OTHER PUBLICATIONS

International Search Report (PCT/ISA/210) dated Jan. 30, 2018, by the French Patent Office as the International Searching Authority for International Application No. PCT/FR2017/053109.

* cited by examiner

*Primary Examiner* — Richard A Huhn
(74) *Attorney, Agent, or Firm* — Buchanan Ingersoll & Rooney P.C.

(57) ABSTRACT

The present invention relates to an extrudable polymer composition comprising:
- 99.5 to 99.95% of at least one hard-soft block copolymer comprising:
  - at least 25% by weight of soft block polyethylene glycol (PEG) with functionality equal to 2, with respect to the total weight in copolymer;
- from 0.05 to 0.5% by weight of at least one polyol comprising at least three hydroxyl groups, with respect to the total weight of the composition; characterised in that:
- the weight-average molecular mass of said copolymer is at least equal to 100,000 g/mol; and
- the weight-average molecular mass of the polyol is at least equal to 1000 g/mol; and
- said at least one polyol binding hard copolymer blocks by ester bonds.

This invention relates in particular to the use of said composition in extrusion processes for manufacturing vapour-permeable objects.

24 Claims, No Drawings

POLYMER COMPOSITION THAT CAN BE EXTRUDED INTO A VAPOUR-PERMEABLE OBJECT

The present invention relates to block copolymer compositions that can be easily extruded, in particular into waterproof, breathable films, and to their manufacturing process. These vapour-permeable compositions can be used, in particular, in the food sector, in the sports equipment industry, and in construction, in particular as insulating materials under residential roofing and to insulate walls.

In these fields, it is important to be able to use polymer films with sufficient vapour permeability to enable foods to be prepared, cooked, smoked and/or packaged, for example.

For certain block copolymers, increasing the polyether group content makes it possible to increase the vapour permeability of these copolymers.

These block copolymers include the copolymers with polyamide blocks and polyether blocks (PEBAs). These PEBAs belong to the special class of polyether ester amides when they result from the copolycondensation of polyamide sequences having carboxylic ends reactive with polyether sequences having reactive ends, which are polyether polyols (polyether diols), with the bonds between the polyamide blocks and the soft polyether blocks being ester bonds.

PEBAs are known for their physical properties such as their flexibility, impact resistance, and ease of use by injection.

However, converting these copolymers by extrusion is complicated, in particular due a low melt viscosity and the resulting low melt strength. A material with low melt strength can in particular cause parts to warp before hardening as they cool.

There are various methods for modelling the melt viscosity of a polymer.

It is thus possible to increase the polyamide level, which tends to increase the viscosity. Moreover, extrudable polymer compositions can be obtained by compounding the block copolymer with other polymers, in particular polyolefins. However, in both cases, this lowers the overall level of PEG in the polymer composition and consequently reduces its vapour permeability.

The melt viscosity can also be increased by lengthening the polymer chains, for example by prolonging the polymerisation. This approach has proved unsatisfactory due to the deterioration of the PEG blocks, which also leads to colouration (yellowing) of the material, without being able to obtain the desired melt viscosity levels of at least 300 Pa s, measured in accordance with ISO standard 1621-10: 2015.

Lastly, it is possible to increase the melt viscosity by simultaneously increasing the size of the various polymer blocks, e.g., the polyamide blocks and polyether blocks in the case of PEBA. For example, by increasing a PEBA PA6-PEG from 1500-1500 to 2000-2000, it should be possible to increase the melt viscosity for an equivalent degree of polymerisation, without deteriorating the vapour-permeability properties. However, the tests conducted to this effect have not been conclusive: the reactivity between the PA blocks and the PEG blocks is considerably reduced.

The purpose of the invention is therefore to provide extrudable block copolymer compositions for the production of objects, such as films, having high vapour permeability, corresponding within the meaning of the invention to an MVTR of at least 700 g/m2, preferably at least 800 g/m2, or even at least 1000 g/m2, per 24 hours at 23° C., at 50% relative humidity and for a sample thickness of 30 μm, measured in accordance with ASTM standard E96B.

Indeed, the applicant has discovered that the melt viscosity of block copolymer compositions can be increased without losing the vapour permeability of the object obtained from these copolymer compositions.

The present invention thus relates to an extrudable polymer composition comprising:
from 20 to 99.95%, preferably from 50 to 99.95%, preferably from 80 to 99.95%, preferably from 99.5 to 99.95% of at least one hard-soft block copolymer, comprising:
at least 25% by weight of soft block polyethylene glycol (PEG) with functionality equal to 2, said 2-functional PEG comprising a maximum of two hydroxyl groups, for the total weight in copolymer;
and
from 0.01 to 10%, preferably from 0.01 to 5%, preferably from 0.05 to 0.5% by weight of at least one polyol (including polyether polyol) with functionality greater than 2 and comprising at least three hydroxyl groups, for the total weight of the composition,
characterised in that:
the weight-average molecular mass of said copolymer is at least equal to 100,000 g/mol.

"Block copolymer", according to the invention, means thermoplastic elastomer (TPE) polymers, which comprise, in alternation, blocks or segments referred to as "hard" or "rigid" (behaving more like thermoplastics) and blocks or segments referred to as "soft" or "flexible" (behaving more like elastomers). A block is referred to as "soft" if it has a low glass transition temperature (Tg). "Low vitreous transition temperature" means a glass transition temperature Tg below 15° C., preferably below 0° C., advantageously below −15° C. and yet more advantageously below −30° C., or even below −50° C.

"Possible flexible or soft blocks in the copolymer according to the invention" means in particular those chosen from among the polyether blocks, polyester blocks, polysiloaxane blocks such as polydimethylsiloxane blocks i.e. PDMS, polyolefin blocks, polycarbonate blocks, and combinations thereof. The possible soft blocks are described, for example, in French patent application No.: 0950637, page 32, line 3, to page 38, line 23. As an example, the polyether blocks are chosen among poly(ethylene glycol) (PEG), poly(1,2-propylene glycol) (PPG), poly(1,3-propylene glycol) (PO3G), poly(tetramethylene glycol) (PTMG), and their copolymers or combinations. The hard blocks can be polyamide-based, polyurethane-based, polyester-based, or a combination of these polymers. These blocks are described in particular in French patent application No.: 0856752. Hard blocks are preferably polyamide-based.

Polyamide (PA) blocks can comprise homopolyamides or copolyamides. The possible polyamide blocks in the composition of the invention are in particular those defined in application FR0950637, from page 27, line 18, to page 31, line 14. Examples of polyamide blocks are those comprising at least one of the following molecules: PA12, PA11, PA10.10, PA6.10, PA6, PA6/12, a copolyamide comprising at least one of the following monomers: 6, 11, 12, 5.4, 5.9, 5.10, 5.12, 5.13, 5.14, 5.16, 5.18, 5.36, 6.4, 6.6, 6.9, 6.10, 6.12, 6.13, 6.14, 6.16, 6.18, 6.36, 10.4, 10.9, 10.10, 10.12, 10.13, 10.14, 10.16, 10.18, 10.36, 10.T, 12.4, 12.9, 12.10, 12.12, 12.13, 12.14, 12.16, 12.18, 12.36, 12.T and combinations or copolymers thereof.

Advantageously, said at least one block copolymer comprises at least one block chosen among: the polyether blocks other than PEG (in addition to the minimum quantity of PEG polyethers with functionality equal to 2 according to the composition of the invention), the polyester blocks, the polyamide blocks, the polyurethane blocks, and combinations thereof. Examples of hard-soft block copolymers are, respectively, (a) copolymers with polyester blocks and polyether blocks (also known as copolyesterethers), (b) copolymers with polyurethane and polyether blocks (also known as thermoplastic polyurethanes or TPUs) and (c)

copolymers with polyamide and polyether blocks (also known as PEBAs according to the IUPAC, or as polyether-block-amides).

Advantageously, in the composition according to the invention, the ratio by weight of the hard blocks to the soft blocks in said at least one copolymer is comprised within the range from 0.5 to 3.

Advantageously, the hard blocks in the copolymer represent 30 to 55% by weight, and the soft blocks in the copolymer represent 45 to 70% by weight, for the total weight of the block copolymer.

Preferably, the number-average molecular mass Mn of the soft blocks in the copolymer is comprised within the range from 500 to 3000 g/mol, preferably from 800 to 2000 g/mol.

Preferably, the number-average molecular mass Mn of the hard blocks in the copolymer is comprised within the range from 500 to 3000 g/mol, preferably from 800 to 2000 g/mol.

Advantageously, said at least one copolymer comprises a copolymer having hard polyamide blocks and soft polyether blocks (PEBA), preferably a polyether-ester amide.

Advantageously, said at least one copolymer in the composition of the invention comprises from 45 to 75% by weight of soft polyethylene glycol (PEG) blocks, preferably from 50 to 70% by weight of PEG blocks, for the total weight of the copolymer.

Advantageously, said at least one copolymer in the composition of the invention comprises at least 50% by weight of PA blocks chosen among: PA6, PA6.6, PA10.10, PA10.12, PA11, PA12, PA6/12, PA6/6.6, and combinations thereof.

Advantageously, said at least one copolymer in the composition according to the invention is chosen among the following PEBAs: PA6-PEG, PA10.10-PEG, PA10.12-PEG, PA11-PEG, PA12-PEG, PA6/12-PEG, PA6.6-PEG, PA6/6.6-PEG, and combinations thereof.

Advantageously, in the composition according to the invention, the weight-average molecular mass of the copolymer is comprised within the range from 100,000 to 200,000 g/mol, preferably from 100,000 to 180,000 g/mol, preferably from 100,000 to 160,000 g/mol.

"Polyol with functionality greater than two" means, in particular:
monomer polyols, in particular aliphatic monomer triols such as glycerol, trimethylolpropane, pentaerythritol, and/or
polymer polyols, in particular polyether-chain triols, polycaprolactone triols, and mixed polyether-polyester polyols with functionality greater than 2.

Advantageously, said at least one polyol is chosen among: pentaerythritol, trimethylolpropane, trimethylolethane, trimethylolpropane, hexanetriol, diglycerol, methylglucoside, tetraethanol, sorbitol, dipentaerythritol, cyclodextrin, the polyether polyols comprising at least three hydroxyl groups, and combinations thereof.

Adding a polyol with functionality greater than 2 induces bridging links that bond hard blocks in the copolymer, preferably by ester bonds.

The maximum weight-average molecular mass of this (these) polyol(s) is 1000 g/mol and is generally comprised within the range from 50 to 1000 g/mol, preferably from 50 to 500 g/mol, preferably from 50 to 200 g/mol.

Advantageously, the extrudable composition according to the invention comprises from 0.15 to 0.2% by weight of said polyol with respect to the total weight of the composition.

To characterise it more precisely, the extrudable composition according to the invention advantageously comprises from 3.5 to 35 µeq/g of said polyol with respect to the total weight of the composition.

Advantageously, the melt viscosity at 230° C. (Pa·s) of the composition according to the invention is greater than 300 Pa·s, preferably greater than 400 Pa·s, preferably comprised within the range of from 400 to 2000 Pa·s, preferably comprised within the range of from 500 to 2000 Pa·s, measured in accordance with ISO standard 1621-10: 2015.

Advantageously, the composition according to the invention does not comprise any polyolefin.

Advantageously, the composition according to the invention also comprises (in addition to the copolymer as defined above), from 0.1 to 80%, preferably from 0.1 to 50%, preferably from 0.1 to 20% by weight of at least one polyamide for the total weight of the composition, chosen among: PA6, PA6/6.6, PA6.12, PA 12, PA11, PA10.10, PA6, PA6.6, PA6.10, PA6/12, a polyamide or copolyamide comprising at least one of the following monomers: 6, 11, 12, 5.4, 5.9, 5.10, 5.12, 5.13, 5.14, 5.16, 5.18, 5.36, 6.4, 6.6, 6.9, 6.10, 6.12, 6.13, 6.14, 6.16, 6.18, 6.36, 10.4, 10.9, 10.10, 10.12, 10.13, 10.14, 10.16, 10.18, 10.36, 10.T, 12.4, 12.9, 12.10, 12.12, 12.13, 12.14, 12.16, 12.18, 12.36, 12.T and combinations or copolymers thereof.

The present invention also relates to an extrusion process characterised in that it uses an extrudable polymer composition according to the invention as defined above, to manufacture a film, sheet, membrane, plate, profile, tube, pipe, hollow body, reservoir, synthetic casing, cable, rod, filament, fibre, and combinations thereof. For example, the composition of the invention can be advantageously drawn by blow moulding and extruded through a heated ring nozzle.

The present invention also relates to an extruded object or item that is likely to be manufactured by extrusion of a composition in accordance with the invention, said object having a vapour permeability (MVTR) of at least 700 g/m2, preferably at least 100 g/m2, preferably comprised within the range of from 1000 to 5000 g/m2, per 24 hours at 23° C., at 50% relative humidity and a sample thickness of 30 µm, measured in accordance with ASTM standard E96B.

Advantageously, this object extruded according to the invention has a saturated water content at 23° C. comprised within the range from 50 to 500% by weight, preferably from 50 to 250%, preferably from 100 to 150%, in accordance with ISO standard 62: 2008, in relation to the weight of the composition according to the invention.

The object extruded from the composition according to the invention advantageously has a tensile elastic modulus below 500 MPa, preferably comprised within the range from 10 to 200 MPa, preferably from 20 to 100 MPa, measured in accordance with ISO standard 527-2: 2012-1A.

Advantageously, said object obtained by extrusion of the composition according to the invention has an instantaneous hardness comprised within the range from 20 to 60 Shore D, preferably from 30 to 50 Shore D, in accordance with ISO standard 868:2003.

The present invention also relates to the use of a polymer composition according to the invention as defined above, in an extrusion process for manufacturing a vapour-permeable object with advantageous properties, in particular regarding MVTR, saturated water content, and mechanical properties, as defined above. According to an advantageous embodiment, the composition according to the invention is used or an additive in polyamide, for example in PA 6, to manufacture films for wrapping sausages for cooking and/or smoking, for example in fumigation). According to an advantageous embodiment, the composition according to the invention is used in waterproof, breathable films for the construction industry.

Said object is advantageously chosen among: a packaging component, in particular for foodstuffs; a food wrap; a wrapping for cooking and/or smoking, particularly of sausage; and any other waterproof, breathable film, in particular one used in the construction industry; a component used in textiles, sports equipment, shoes, sports shoes, shoe soles, decoration, luggage, glasses, furniture, in electrical, electronic, audio-visual, computer, automotive or aeronautic equipment; and/or a component in medical equipment.

EXAMPLES

The following examples illustrate the present invention without limiting the scope thereof. In the examples, unless otherwise stated, all percentages and portions are expressed in weight.

Copolymers used in the compositions in the following tests (examples and comparisons):
Comparison 1: Cp1
PEBA 1: PA12-PEG based on PA12 blocks of Mn=4500 g/mol and PEG blocks of Mn=1500 g/mol; hard block/soft block ratio: 3.
Weight-average molecular mass of the PEBA 1 (Mw)=111,000 g/mol
Comparison 2: Cp2
PEBA 2: PA6-PEG based on PA6 blocks of Mn=1500 g/mol and PEG blocks of Mn=1500 g/mol; hard block/soft block ratio: 1.
Weight-average molecular mass of the PEBA 2 (Mw)=112,000 g/mol Example 1 According to the Invention: Ex1

PEBA 2+0.1% pentaerythritol ("PET") composition
Weight-average molecular mass of the PEBA 2+0.1% PET (Mw)=144,000 g/mol Although the tests refer to a PEBA (Pebax®)-based composition, it is clearly understood that the compositions according to the present invention are not limited to this embodiment, but can comprise any type of block copolymer, alone or in combination.

Table 1 below shows the results for inherent viscosity and melt viscosity for compositions Cp1, Cp2 and Ex1, as well as the results of the measurements of MVTR, saturated water content, and hardness obtained for objects extruded from these respective compositions.

TABLE 1

| Test/Composition | Inherent viscosity ISO 307 ATO: 0.5% mass in metacresol at 20° C., in g/g | Melt viscosity at 230° C., 10 rad/s (Pa·s) ISO 6721-10: 2015 | MVTR ASTM E96 B (per 24 hrs, at 23° C., RH 50%, 30 μm) | Saturated water content at 23° C. (%) ISO 62: 2008 | Shore D Hardness ISO 868: 2003 |
|---|---|---|---|---|---|
| Cp1/PEBA 1 (12/PEG 4500/1500) | 1.5 | 700 | 560 | <50 | 60 |
| Cp2/PEBA 2 (6/PEG 1500/1500) | 1.35 | 200 | 1070 | >100 | 40 |
| Ex1/PEBA 2 + 0.1% PET | 1.4 | 500 | 1125 | >100 | 40 |

It can be seen that composition Ex1 according to the invention is more easily extrudable than composition Cp2.

Table 2

Table 2 shows the results for the tensile strength measured in accordance with ISO standard 527-2: 2012-1A.

Tensile tests were conducted on both 30 μm-thick films manufactured using CAST technology. The longitudinal and transversal directions were studied in both films with three test samples for each direction.
v=100 L0=50;
Vinitial=1 mm/min up to 1% deformation of the test sample (to calculate the modulus);
Vfinal=100 mm/min up until the test sample broke (to measure the deformation and stress at yield and break.)
The test samples used were ISO 527-3 strips and L0 was set at 50 mm.

| | | At yield | | | | At break | | | |
|---|---|---|---|---|---|---|---|---|---|
| | | Warping (%) | | Stress (MPa) | | Warping (%) | | Stress (MPa) | |
| | direction | Mean (n = 3) | s | Mean (n = 3) | s | Mean (n = 3) | s | Mean (n = 3) | s |
| Cp2 | longitudinal | 26 | 5 | 10.4 | 1.0 | 524 | 32 | 46.4 | 6.1 |
| | transversal | 21 | 2 | 6.9 | 0.3 | 934 | 30 | 34.2 | 2.2 |
| Ex1 | longitudinal | 26 | 4 | 10.3 | 0.3 | 537 | 54 | 46.7 | 4.4 |
| | transversal | 19 | 1 | 6.7 | 0.1 | 849 | 16 | 28.7 | 1.0 |

-continued

|  | direction | Modulus (MPa) Mean (n = 3) | s |
|---|---|---|---|
| Cp2 | longitudinal | 48.9 | 4.3 |
|  | transversal | 75.4 | 3.2 |
| Ex1 | longitudinal | 58.8 | 4.2 |
|  | transversal | 73.7 | 3.9 |

The mechanical properties of the Cp2 and Ex1 films obtained are similar, whether in the longitudinal or transversal extrusion direction.

The invention claimed is:

1. An extrudable polymer composition comprising:
   from 50 to 99.95% by weight of at least one hard-soft block copolymer comprising:
      at least one hard block and at least one soft block, wherein the at least one hard block is polyamide-based, polyurethane-based, polyester-based or a combination thereof;
      at least 25% by weight of polyethylene glycol (PEG) with functionality equal to 2, with respect to the total weight of the hard-soft block copolymer; and
   from 0.01 to 5% by weight of at least one polyol with functionality greater than 2 and comprising at least three hydroxyl groups,
   with respect to the total weight of the composition, wherein:
   the weight-average molecular mass of said hard-soft block copolymer is at least equal to 100,000 g/mol; and
   the weight-average molecular mass of the polyol is at most equal to 1000 g/mol; and
   said at least one polyol is bound to the at least one hard block by ester bonds.

2. The extrudable composition according to claim 1, wherein it comprises from 0.15 to 0.2% by weight of said polyol, with respect to the total weight of the composition.

3. The composition according to claim 1, wherein said at least one hard-soft block copolymer comprises at least one block chosen among: polyether blocks other than PEG; polyester blocks; polyamide blocks; polyurethane blocks; or combinations thereof.

4. The composition according to claim 1, wherein the at least one hard-soft block copolymer is comprised of hard blocks and soft blocks, wherein the ratio by weight of hard blocks to soft blocks is in the range from 0.5 to 3.

5. The composition according to claim 1, wherein:
   the at least one hard block represents from 30 to 55% by weight; and
   the at least one soft block represents from 45 to 70% by weight,
of the total weight of the hard-soft block copolymer.

6. The composition according to claim 1, wherein the number-average molecular mass Mn of the at least one soft block of the hard-soft block copolymer is in the range from 500 to 3000 g/mol.

7. The composition according to claim 1, wherein the number-average molecular mass Mn of the at least one hard block of the hard-soft block copolymer is in the range from 500 to 3000 g/mol.

8. The composition according to claim 1, wherein said at least one hard-soft block copolymer comprises a copolymer with hard polyamide blocks and soft polyether blocks (PEBA).

9. The composition according to claim 1, wherein said at least one hard-soft block copolymer comprises from 45 to 75% by weight of polyethylene glycol (PEG) blocks, for the total weight of the hard-soft block copolymer.

10. The composition according to claim 1, wherein said at least one hard-soft block copolymer comprises at least 50% by weight of PA blocks chosen among: PA6, PA6.6, PA10.10, PA10.12, PA11, PA12, PA6/12, PA6/6.6, and combinations thereof.

11. The composition according to claim 1, wherein said at least one hard-soft block copolymer is chosen among the following PEBAs: PA6-PEG, PA10.10-PEG, PA10.12-PEG, PA11-PEG, PA12-PEG, PA6/12-PEG, PA6.6-PEG, PA6/6.6-PEG, and combinations thereof.

12. The composition according to claim 1, wherein the weight-average molecular mass of the at least one hard-soft block copolymer is in the range from 100,000 to 200,000 g/mol.

13. The composition according to claim 1, wherein the weight-average molecular mass of said at least one polyol is in the range from 50 to 1000 g/mol.

14. The composition according to claim 1, wherein said at least one polyol is chosen among: pentaerythritol, trimethylolpropane, trimethylolethane, hexanetriol, diglycerol, methylglucoside, sorbitol, dipentaerythritol, cyclodextrin, polyether polyols comprising at least three hydroxyl groups, and combinations thereof.

15. The composition according to claim 1, wherein its melt viscosity at 230° C. (Pa·s) is greater than 400 Pa·s, measured in accordance with ISO standard 1621-10: 2015.

16. The composition according to claim 1, wherein it does not comprise any polyolefin.

17. The composition according to claim 1, wherein it also comprises at least one polyamide chosen among: PA12, PA11, PA10.10, PA6, PA 6.6, PA6/12, a copolyamide comprising at least one of the following monomers: 6, 11, 12, 5.4, 5.9, 5.10, 5.12, 5.13, 5.14, 5.16, 5.18, 5.36, 6.4, 6.6, 6.9, 6.10, 6.12, 6.13, 6.14, 6.16, 6.18, 6.36, 10.4, 10.9, 10.10, 10.12, 10.13, 10.14, 10.16, 10.18, 10.36, 10.T, 12.4, 12.9, 12.10, 12.12, 12.13, 12.14, 12.16, 12.18, 12.36, 12.T and combinations or copolymers thereof.

18. An extrusion process wherein it uses an extrudable polymer composition according to claim 1, to manufacture a film, sheet, membrane, plate, profile, tube, pipe, hollow body, reservoir, synthetic casing, cable, rod, filament or fibre.

19. An extruded object manufactured in accordance with claim 18, said object having a vapour permeability (MVTR) of at least 700 g/m2 per 24 hours at 23° C., at 50% relative humidity and a sample thickness of 30 μm, measured in accordance with ASTM standard E96B.

20. The extruded object according to claim 19, wherein it has a saturated water content at 23° C. in the range of from 50 to 500% by weight, in accordance with ISO standard 62: 2008, in relation to the weight in PEBA.

21. The object according to claim 19, wherein it has a tensile elastic modulus below 500 MPa, measured in accordance with ISO standard 527-2: 2012-1A.

22. The object according to claim 19, wherein it has an instantaneous hardness in the range of from 20 to 60 Shore D, in accordance with ISO standard 868: 2003.

23. The object according to claim 19, said object being a packaging component; a food wrap; a wrapping for cooking and/or smoking; a waterproof, breathable film; a component used in textiles, sports equipment, shoes, sports shoes, shoe soles, decoration, luggage, glasses, furniture, in electrical, electronic, audio-visual, computer, automotive or aeronautic equipment; and/or a component in medical equipment.

24. An extrusion method to manufacture a vapour-permeable object with the polymer composition according to claim 1, wherein the method comprises
   drawing the composition by blow moulding; and
   extruding the composition through a heated ring nozzle.

* * * * *